US011974094B2

(12) United States Patent
Zhan et al.

(10) Patent No.: US 11,974,094 B2
(45) Date of Patent: Apr. 30, 2024

(54) MEMS MICROPHONE

(71) Applicant: Goertek, Inc., Weifang (CN)

(72) Inventors: Junkai Zhan, Weifang (CN); Jun Li, Weifang (CN); Mengjin Cai, Weifang (CN)

(73) Assignee: Goertek, Inc., Shandong (CN)

( * ) Notice: Subject to any disclaimer, the term of this patent is extended or adjusted under 35 U.S.C. 154(b) by 1287 days.

(21) Appl. No.: 16/475,506

(22) PCT Filed: Mar. 3, 2017

(86) PCT No.: PCT/CN2017/075592
§ 371 (c)(1),
(2) Date: Jul. 2, 2019

(87) PCT Pub. No.: WO2018/137275
PCT Pub. Date: Aug. 2, 2018

(65) Prior Publication Data

US 2023/0199406 A1 Jun. 22, 2023

(30) Foreign Application Priority Data

Jan. 25, 2017 (CN) ......................... 201720106652.2

(51) Int. Cl.
*H04R 19/04* (2006.01)
*H04R 7/04* (2006.01)
*H04R 19/00* (2006.01)

(52) U.S. Cl.
CPC ............... *H04R 19/04* (2013.01); *H04R 7/04* (2013.01); *H04R 19/005* (2013.01); *H04R 2201/003* (2013.01)

(58) Field of Classification Search
CPC .... H04R 31/003; H04R 29/004; H04R 19/04; H04R 19/005; H04R 2201/003; H04R 31/00; H04R 3/00; H04R 7/04; H04R 1/04
See application file for complete search history.

(56) References Cited

U.S. PATENT DOCUMENTS 6,830,229 B2 12/2004 Wetzel et al.
2006/0093171 A1* 5/2006 Zhe ...................... H04R 31/003 381/396
2012/0328132 A1* 12/2012 Wang ..................... H04R 19/04 381/174
2014/0084396 A1* 3/2014 Jenkins ................ H04R 23/006 257/419

(Continued)

FOREIGN PATENT DOCUMENTS

CN 104541521 A 4/2015
CN 204425633 U 6/2015

*Primary Examiner* — Carolyn R Edwards
*Assistant Examiner* — Julie X Dang
(74) *Attorney, Agent, or Firm* — Baker Botts, LLP

(57) ABSTRACT

A MEMS microphone is provided, comprising a substrate having a back cavity, and a plate capacitor structure arranged on the substrate, the plate capacitor structure being formed by a vibration diaphragm, a backplate and a support portion; wherein a pressure relief device is provided in the vibration diaphragm, a pressure maintaining channel is formed between the vibration diaphragm and the backplate; and the pressure relief device in the vibration diaphragm constitutes an inlet of the pressure maintaining channel.

7 Claims, 2 Drawing Sheets

(56) References Cited

U.S. PATENT DOCUMENTS

| | | | | |
|---|---|---|---|---|
| 2014/0161290 | A1* | 6/2014 | Jenkins | H04R 23/006 381/174 |
| 2015/0014796 | A1* | 1/2015 | Dehe | B81B 3/0021 257/416 |
| 2015/0245123 | A1* | 8/2015 | Uchida | H04R 19/005 381/162 |
| 2016/0037266 | A1* | 2/2016 | Uchida | H04R 7/06 381/174 |
| 2016/0176704 | A1* | 6/2016 | Cargill | H04R 19/04 257/419 |
| 2016/0304336 | A1* | 10/2016 | Schoen | B81C 1/00214 |
| 2017/0041708 | A1* | 2/2017 | Barzen | H04R 29/001 |
| 2017/0289702 | A1* | 10/2017 | Inoue | H04R 19/04 |
| 2018/0002168 | A1* | 1/2018 | Cargill | B81B 3/0072 |
| 2018/0077498 | A1* | 3/2018 | Yoo | H04R 7/06 |

* cited by examiner

MEMS MICROPHONE

CROSS-REFERENCE TO RELATED APPLICATIONS

This application is a National Stage of International Application No. PCT/CN2017/075592, filed on Mar. 3, 2017, which claims priority to Chinese Patent Application No. 201720106652.2, filed on Jan. 25, 2017, both of which are hereby incorporated by reference in their entireties.

TECHNICAL FIELD

The present disclosure relates to a MEMS microphone, and more particularly, to a MEMS microphone having a function of pressure relief.

BACKGROUND

MEMS (Micro-electromechanical Systems) microphones are manufactured based on the MEMS technology. For a MEMS microphone, a vibration diaphragm and a backplate are important components, which constitute a capacitor and are integrated on a silicon wafer, so as to realize the acoustic-electric conversion. In a traditional vibration diaphragm manufacturing process, an oxide layer is first formed on a silicon substrate, a vibration diaphragm layer is then deposited on the oxide layer, after being doped and tempered, the vibration diaphragm is then etched with a desired pattern, and then the vibration diaphragm is fixed to the substrate via rivet points at an edge of the vibration diaphragm. Further, it is also necessary to lead an electrode out from the vibration diaphragm. The distance between the vibration diaphragm and the back plate is changed with the vibration of the vibration diaphragm, so that a sound signal is converted into an electrical signal.

When the MEMS microphone is mechanically shocked, blown, or falls, a MEMS chip in the MEMS microphone would be subjected to a tremendous sound pressure shock. Frequently, the vibration diaphragm would therefore be subjected to an excessive pressure and damaged, resulting in a failure of the microphone. In order to solve this problem, the vibration diaphragm is usually provided with a pressure relief device to buffer the shock to the vibration diaphragm. However, the disadvantage of this structure is that a desired result cannot be achieved until the number of pressure relief channels of the pressure relief device satisfies a lower limit of pressure relief for blowing. However, the overall rigidity of a film will be inevitably reduced when too many holes are formed in the film. In addition, in a falling process, the vibration diaphragm is likely to crack due to the excessive number of holes and slotting designs, so that the reliability of the vibration diaphragm is extremely low.

SUMMARY

An object of the present disclosure is to provide a new technical solution of a MEMS microphone.

According to a first aspect of the present disclosure, there is provided a MEMS microphone, comprising a substrate having a back cavity, and a plate capacitor structure arranged on the substrate, the plate capacitor structure being formed by a vibration diaphragm, a backplate and a support portion; wherein a pressure relief device is provided in the vibration diaphragm, a pressure maintaining channel is formed between the vibration diaphragm and the backplate; and the pressure relief device in the vibration diaphragm constitutes an inlet of the pressure maintaining channel.

Optionally, a main pressure relief hole is provided in the backplate at a position that is relatively away from the pressure relief device, and the pressure maintaining channel is delimited by the vibration diaphragm and the backplate in an area between the pressure relief device and the main pressure relief hole.

Optionally, the main pressure relief hole has a diameter between 5-10 μm.

Optionally, the pressure relief device is located in a central area of the vibration diaphragm, and the main pressure relief hole comprises a plurality of main pressure relief holes distributed in an edge of the backplate in a circumferential direction.

Optionally, the pressure relief device comprises a plurality of pressure relief devices evenly distributed in an edge of the vibration diaphragm, and the main pressure relief hole is formed in a central area of the backplate.

Optionally, the pressure relief device and the main pressure relief hole are arranged at two opposite ends of the vibration diaphragm and the backplate respectively.

Optionally, auxiliary pressure relief holes are further formed in the backplate in addition to the main pressure relief holes, and the diameters of the auxiliary pressure relief holes are smaller than the diameter of the main pressure relief hole.

Optionally, the auxiliary relief holes in the backplate which are located in an area of the pressure maintaining channel has a diameter between 2.5-5 μm.

Optionally, the auxiliary pressure relief holes are distributed at a distance to the pressure relief device within a range of 50 μm.

Optionally, the pressure relief device is a valve flap structure or a hole structure).

For the microphone provided by the prevent disclosure, the dynamic balance between the pressure of air entering into the pressure maintaining channel and an instant shock from the external environment to the vibration diaphragm can be achieved through the counteraction between the pressure of the air and the force of the instant shock, so that the shock to the vibration diaphragm can be effectively buffered. By adopting the present structure for pressure relief, the reliability of the vibration diaphragm is improved without intensive pressure relief designs.

The inventor of the present disclosure finds that in the prior art, a pressure relief device is usually provided in the vibration diaphragm to buffer the shock to the vibration diaphragm. However, the disadvantage of this structure is that a desired result cannot be achieved until the number of pressure relief channels satisfies a lower limit of pressure relief for blowing. But, the overall rigidity of a film will be inevitably reduced when too many holes are formed in the film. In addition, in a falling process, the vibration diaphragm is likely to crack due to the excessive number of holes and slotting designs, so that the reliability of the vibration diaphragm is extremely low. Therefore, the technical task to be achieved or the technical problem to be solved by the present disclosure is unintentional or unanticipated for those skilled in the art, and thus the present disclosure refers to a novel technical solution.

Further features of the present disclosure and advantages thereof will become apparent from the following detailed description of exemplary embodiments according to the present disclosure with reference to the accompanying drawings.

BRIEF DESCRIPTION OF THE DRAWINGS

The accompanying drawings, which are incorporated in and constitute a part of the description, illustrate embodiments of the present disclosure and, together with the description thereof, serve to explain the principles of the present disclosure.

DETAILED DESCRIPTION

Figure 1:
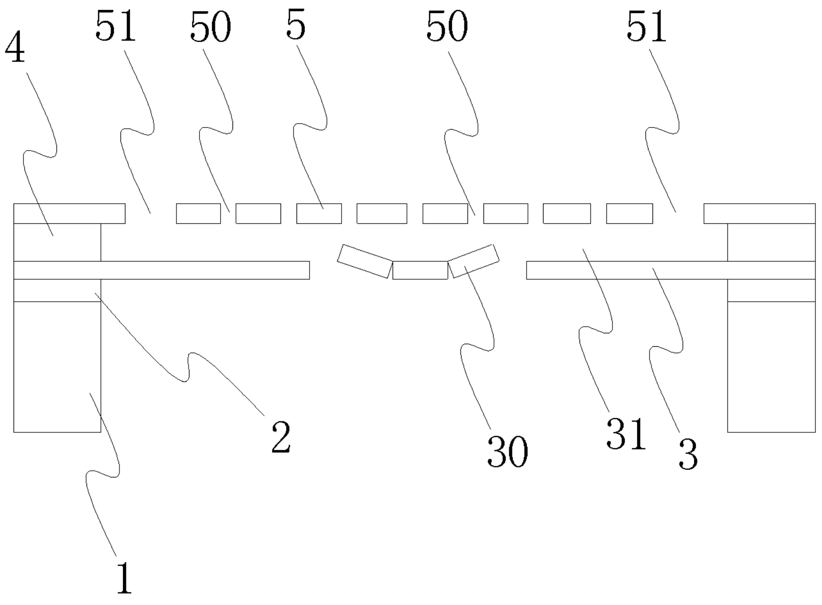
FIG. 1 is a schematic structure view of a microphone according to a first embodiment of the present disclosure.

Various exemplary embodiments of the present disclosure will now be described in detail with reference to the drawings. It should be noted that the relative arrangement of the components and steps, the numerical expressions, and numerical values set forth in these embodiments do not limit the scope of the present disclosure unless it is specifically stated otherwise.

The following description of at least one exemplary embodiment is merely illustrative in nature and is in no way intended to limit the present disclosure, its application, or uses.

Techniques and equipment as known by one of ordinary skill in the relevant art may not be discussed in detail but are intended to be part of the description where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed in the accompanying drawings.

Referring to FIG. 1, the present disclosure discloses a MEMS microphone comprising a substrate 1 having a back cavity. A vibration diaphragm 3 and a backplate 5 are provided on the substrate 1. In the present disclosure, the vibration diaphragm 3 and the backplate 5 can be sequentially deposited on the substrate 1. The substrate 1 can be made from monocrystalline silicon, and the vibration diaphragm 3 and the backplate 5 can be made from monocrystalline silicon or polycrystalline silicon. The selection of such materials and the deposition process are well known to those skilled in the art and will not be described in detail herein.

The backplate 5 and the vibration diaphragm 3 constitute a plate capacitor structure which can be formed in such a manner that, for example, the backplate 5 is located above the vibration diaphragm 3, or the backplate 5 is located below vibration diaphragm 3. For ease of description, the technical solution of the present disclosure will be described by taking the plate capacitor structure in which the backplate 5 is located above the vibration diaphragm 3 as an example.

In order to achieve the insulation between the vibration diaphragm 3 and the substrate 1, an insulating layer 2 is arranged at a position where the vibration diaphragm 3 is connected to the substrate 1, and can be made from silicon dioxide well known to those skilled in the art. In order to ensure that the plate capacitor structure having a certain gap can be formed between the backplate 5 and the vibration diaphragm 3, a support portion 4 is further provided between the backplate 5 and the vibration diaphragm 3. The support portion 4 can support the backplate 5 and at the same time ensure the insulation between the backplate 5 and the vibration diaphragm 3. The MEMS microphone having this capacitor structure is well known to those skilled in the art and will not be described in detail herein.

Figure 2:
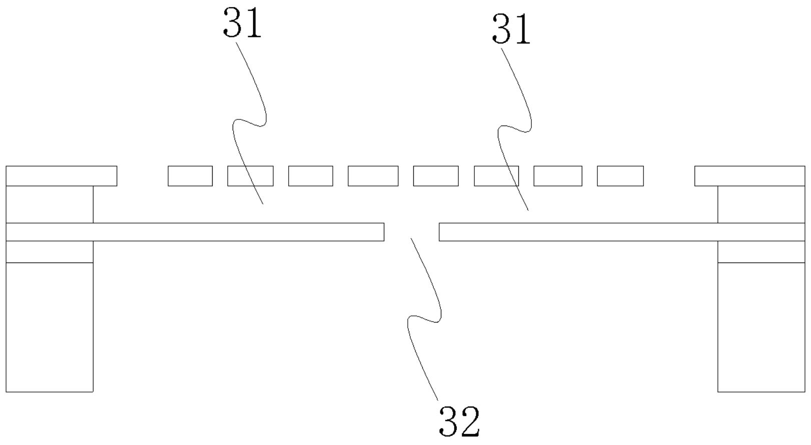
FIG. 2 is a schematic structure view of a microphone according to a second embodiment of the present disclosure.

For the microphone provided by the present disclosure, a pressure relief device is further provided in the vibration diaphragm 3. When the microphone is subjected to a tremendous sound pressure caused by, for example, a mechanical shock, a blowing process, or a falling process, the pressure relief device forms a pressure relief path to relieve the pressure. The pressure relief device of the present disclosure can be a valve flap structure 30 as shown in FIG. 1 or a hole structure 32 as shown in FIG. 2. The pressure relief path can be effectively formed in the vibration diaphragm 3 via the valve flap structure 30 shown in FIG. 1 or the hole structure 32 shown in FIG. 2. It is well known to those skilled in the art that the pressure relief device adopts the flap structure or the hole structure.

For the microphone of the present disclosure, a pressure maintaining channel 31 is formed between the vibration diaphragm 3 and the backplate 5, and the pressure relief device on the vibration diaphragm 3 constitute an inlet of the pressure maintaining channel 31, as shown in FIG. 1 and FIG. 2. An edge of the backplate 5 is supported above the vibration diaphragm 3 by the support portion 4. When the microphone is subjected to the tremendous sound pressure caused by, for example, the mechanical shock, the blowing process, or the falling process, strong airflow enters the pressure maintaining channel 31 from the pressure relief device, so that a certain pressure can be formed in the pressure maintaining channel 31. The pressure acts on an inner side of the vibration diaphragm 3, so that the dynamic balance between the pressure and the shock to an outer side of the vibration diaphragm 3 can be achieved, thereby reducing the force of the instant shock to the outer side of the vibration diaphragm 3. For the microphone provided by the prevent disclosure, the dynamic balance between the pressure of air entering the pressure maintaining channel 31 and the instant shock from the external environment to the vibration diaphragm can be achieved through the counteraction between the pressure and the force of the instant shock, so that the shock to the vibration diaphragm can be effectively buffered. By adopting the present structure for pressure relief, the reliability of the vibration diaphragm is improved without intensive pressure relief designs.

Taking FIG. 1 as an example, when the microphone operates, the vibration diaphragm 3 is deformed toward or away from the backplate 5. In order to improve the performance of the vibration diaphragm 3, a main pressure relief hole 51 is formed in the backplate 5. The main pressure relief hole can have a diameter between 5-10 μm. The air pressure between the vibration diaphragm 3 and the backplate 5 can be equalized through the main pressure relief hole 51, thereby reducing air damping to the operating vibration diaphragm 3.

The main pressure relief hole 51 constitutes an outlet of the pressure maintaining channel 31. However, this is disadvantageous for the functioning of the pressure maintaining channel 31. In order to solve this problem, the main pressure relief hole 51 is formed on the backplate 5 at a position that is relatively away from the valve flap structure 30. In this way, the pressure maintaining channel 31 is delimited by the vibration diaphragm 3 and the backplate 5 in an area between the valve flap structure 30 and the main pressure relief holes 51.

When entering between the vibration diaphragm 3 and the backplate 5 through the valve flap structure 30, the airflow from the external environment passes a long channel to exit from the main pressure relief hole 51. Therefore, before the airflow exits via the main pressure relief hole 51, the pressure maintaining channel 31 located between the main pressure relief holes 51 and valve flap structure 30 can function to maintain the pressure, that is, the airflow entering the pressure maintaining channel 31 can counter the great shock to the outer side of the vibration diaphragm 3.

Figure 3:
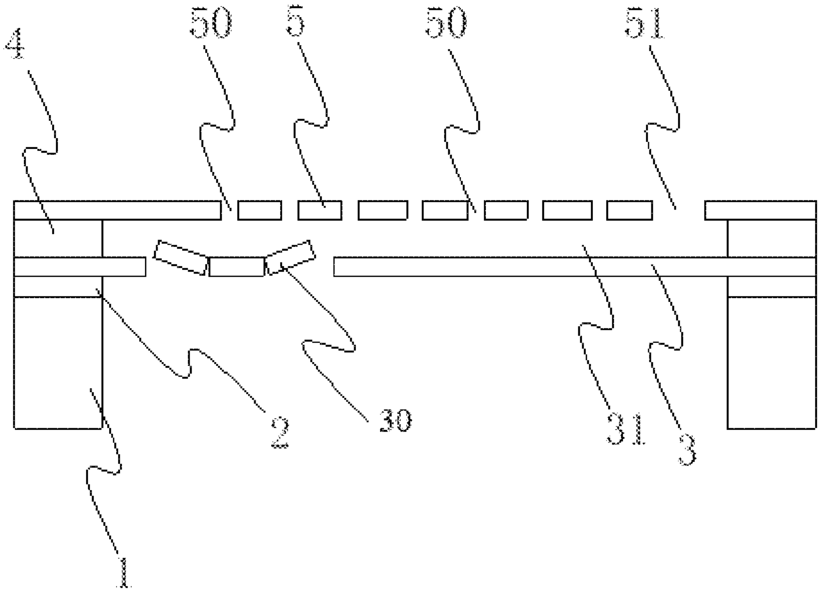
FIG. 3 is an alternatively schematic structure view of a microphone according to a first embodiment of the present disclosure.

In a specific embodiment of the present disclosure, referring to FIG. 1, the valve flap structure 30 can be located in a central area of the vibration diaphragm 3, and the main pressure relief hole comprises a plurality of main pressure relief holes 51 evenly distributed in the edge of the backplate 5 in a circumferential direction. In another specific embodiment of the present disclosure, the valve flap structure 30 comprises a plurality of valve flap structures 30 evenly distributed in an edge of the vibration diaphragm 3, and the main pressure relief hole 51 is formed in a central area of the backplate 5. It is also possible that the valve flap structure 30 and the main pressure relief hole 51 are located at two opposite ends of the vibration diaphragm 3 and the backplate 5, respectively. For example, the valve flap structure 30 is located at a left side of the vibration diaphragm 3, and the main pressure relief hole 51 is located at a right side of the backplate 5, as shown in FIG. 3, so that the passage of the pressure maintaining channel 31 is longer.

In order to further reduce the air damping to the vibration diaphragm during operation, a plurality of pressure relief holes are generally formed in the entire backplate 5, but these pressure relief holes are disadvantages for the pressure maintaining channel to maintain the pressure. That is, the airflow passing through the valve structure leaks out quickly through these pressure relief holes. In order to solve this problem, in the microphone of the present disclosure, auxiliary pressure relief holes 50 are further formed in the backplate 5 in addition to the main pressure relief hole 51. The diameters of the auxiliary pressure relief holes 50 are smaller than the diameter of the main pressure relief hole 51. The auxiliary pressure relief holes 50 are configured to affect neither the pressure maintaining function of the pressure maintaining channel 31 in the falling process, nor the pressure equalization effect between the backplate and the vibration diaphragm during the operation.

For example, the auxiliary relief holes in the backplate which are located in an area of the pressure maintaining channel have a diameter between 2.5-5 μm. Each auxiliary pressure relief hole 50 can be located in the backplate 5 at a position that is between the main pressure relief hole 51 and the valve flap structure 30. As the diameters of the auxiliary pressure relief holes 50 are smaller, the air entering the pressure maintaining channel 31 cannot leak out from the auxiliary pressure relief holes 50 quickly. Thus, the pressure maintaining channel 31 can function to maintain the pressure.

If the diameter of the auxiliary pressure relief hole 50 is too large, it is disadvantages for the pressure maintaining channel 31 to maintain the pressure. If the diameter of the auxiliary pressure relief hole 50 is too small, it is disadvantages for the vibration diaphragm and the backplate to perform the pressure equalization effect, thus adversely affecting the performance of the vibration diaphragm. In addition, if the area occupied by the auxiliary pressure relief holes 50 in the backplate 5 is too large, and the area occupied by the main pressure relief hole in the backplate 5 is too small, the performance of the vibration diaphragm will be adversely affected during the normal operation. In a specific embodiment of the present disclosure, the auxiliary pressure relief holes 50 are distributed at a distance to the valve flap structure within a range of 50 μm. Of course, those skilled in the art can select the main and auxiliary pressure relief holes with suitable diameters and numbers, and can select distribution positions for the main pressure relief holes, the auxiliary pressure relief holes and the pressure relief device, so as to meet a design requirement.

Although some specific embodiments of the present disclosure have been demonstrated in detail with examples, it should be understood by a person skilled in the art that the above examples are only intended to be illustrative but not to limit the scope of the present disclosure. It should be understood by those skilled in the art that the above embodiments can be modified without departing from the scope and spirit of the present disclosure. The scope of the present disclosure is defined by the appended claims.

The invention claimed is:

1. A MEMS microphone, comprising a substrate having a back cavity, and a plate capacitor structure arranged on the substrate, the plate capacitor structure being formed by a vibration diaphragm, a backplate and a support portion; wherein a pressure relief device is provided in the vibration diaphragm, a main pressure relief hole is provided in the backplate only at a position that is relatively away from the pressure relief device, the main pressure relief hole has a diameter between 5-10 μm, a pressure maintaining channel is formed between the vibration diaphragm and the backplate; the pressure maintaining channel is delimited by the vibration diaphragm and the backplate in an area between the pressure relief device and the main pressure relief hole, the pressure relief device in the vibration diaphragm constitutes an inlet of the pressure maintaining channel, and the main pressure relief hole constitutes an outlet of the pressure maintaining channel, wherein the pressure relief device comprises a valve flap structure, the valve flap structure being located at a left side of the vibration diaphragm, and the main pressure relief hole is positioned solely at a right side of the backplate, such that a passage of the pressure maintaining channel is elongated.

2. The MEMS microphone of claim 1, wherein the main pressure relief hole is distributed in an edge of the backplate in a circumferential direction.

3. The MEMS microphone of claim 1, wherein the pressure relief device comprises a plurality of pressure relief devices evenly distributed in an edge of the vibration diaphragm.

4. The MEMS microphone of claim 1, wherein the pressure relief device and the main pressure relief hole are arranged at two opposite ends of the vibration diaphragm and the backplate respectively.

5. The MEMS microphone of claim 1, wherein auxiliary pressure relief holes are further formed in the backplate in addition to the main pressure relief holes, and the diameters of the auxiliary pressure relief holes are smaller than the diameter of the main pressure relief hole.

6. The MEMS microphone of claim 5, wherein the auxiliary relief holes in the backplate which are located in an area of the pressure maintaining channel has a diameter between 2.5-5 μm.

7. The MEMS microphone of claim 6, wherein the auxiliary pressure relief holes are distributed at a distance to the pressure relief device within a range of 50 μm.

* * * * *